Figure 1:
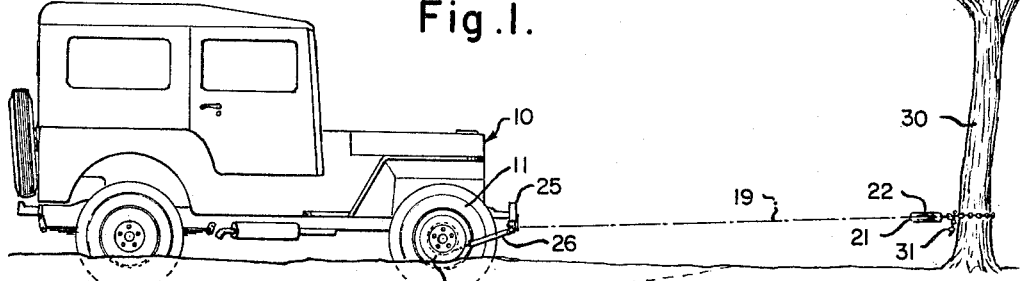

Oct. 11, 1966 C. A. JACK 3,278,159
WINCH ATTACHMENTS FOR DRIVEN WHEELS OF AUTOMOBILES
Filed Feb. 19, 1964

INVENTOR
Clyde A. Jack his attorneys

United States Patent Office 3,278,159
Patented Oct. 11, 1966

3,278,159
WINCH ATTACHMENTS FOR DRIVEN WHEELS OF AUTOMOBILES
Clyde A. Jack, 418 Allenhurst Ave., Ridgway, Pa.
Filed Feb. 19, 1964, Ser. No. 345,936
4 Claims. (Cl. 254—166)

This invention relates to winch attachments for drive wheels of automobiles and particularly to a compact readily attachable device for winching a driven vehicle out of places from which their tractive power is inadequate to drive them. For example, vehicles are not infrequently "bogged down" in mud, snow or sand and unable to move either forward or backward under their own tractive power. This is true even in the case of four wheel drive vehicles.

Winches on vehicles for use in off-the-road service are not new. Such winches are usually mounted on the front of the vehicle and are driven by means of a power take-off from the transmission. Such winches have limited usefulness and can only be used to move the vehicle in one direction. It has also been proposed to place a drum on one or more of the drive wheels to use the power in the wheels as the winching means. For example, Loomis Patent 2,751,193, Tourand Patent 2,737,355 and Zillgitt Patent 903,942 provide drums attachable to the drive wheels, each carrying a separate cable adapted to be attached to a stake so that on rotation of the wheel the cable would be spooled to pull the vehicle. Such devices are not satisfactory because the two drive wheels do not slip to the same degree, thus causing one cable to spool faster than the other and forcing the vehicle to pull to the side. This causes the cable to become out of line and cease spooling and could cause serious damage to the vehicle. Others like Delamere Patent 936,866 connect the two lines to a single support which is even more limiting because it permits movement in only one direction and Nelson Patent 1,198,372 connects the center of a single rope to a stake to achieve the same limited purpose as Delamere. In all cases, the unequal slip of the drive wheels will cause the vehicle to be pulled sidewise into one or the other of the cables so that spool of the other becomes impossible because of the out of line condition thus created.

I have invented a winch attachment for the drive wheels of a vehicle which overcomes these disadvantages and which is easily stored and used.

In a preferred embodiment of my invention, I provide a pair of telescoping cylindrical members of substantially equal length and having an inner diameter greater than the wheel stud diameter, a radially outwardly extending flange on one end of each member, a radially inwardly extending flange on the other of said members extending inwardly to provide an axle receiving opening and having wheel stud openings therein a part of which are of sufficient size to pass over the holding head of the stud, a keyhole shaped opening in the periphery of each cylinder, a single cable having an enlarged portion on each end adapted to pass through the large portion of the keyhole shaped opening in each cylinder and be engaged in the slot portion of said keyhole opening, a single pulley carrying the rope intermediate its ends, means for attaching said pulley to a fixed support and guide means removably attached to the end of the vehicle at each side receiving the cable between the cylinders and the pulley guiding said cables from the cylinder to a point beyond the vehicle. Preferably, the guide means include ring means removably attached to the bumpers of the vehicle and guide tubes removably hinged to said ring means and extending substantially between said ring means and the full spool periphery of said cylinders.

Figure 2:
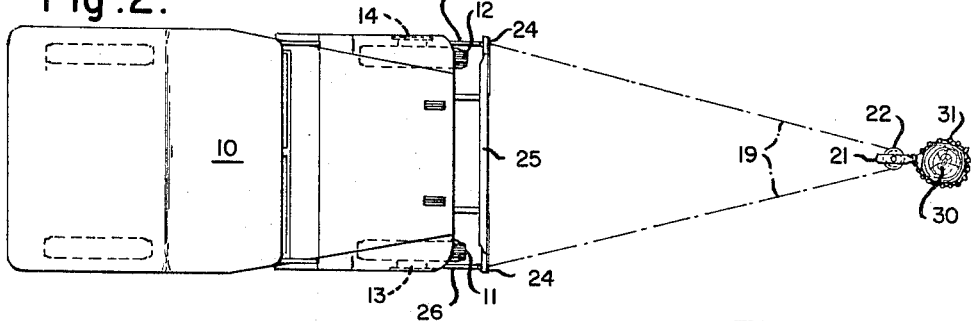
Figure 3:
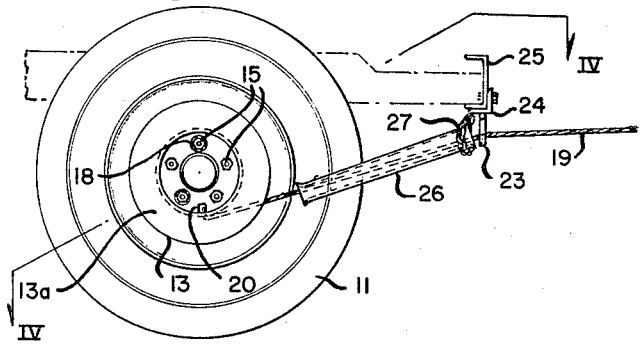
Figure 5:
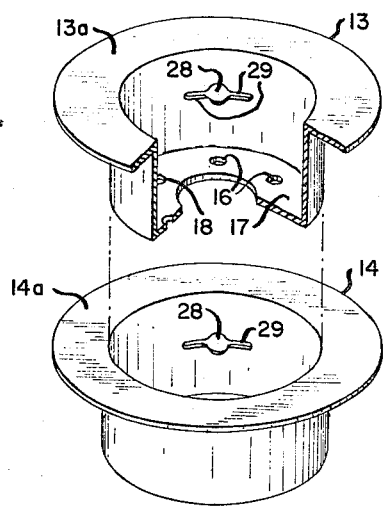
Figure 4:
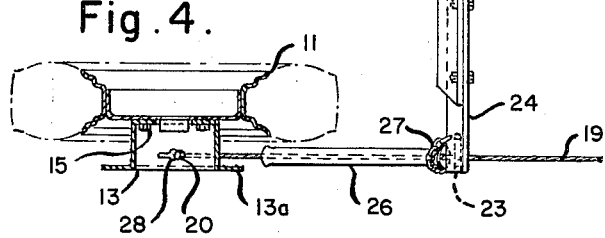

In the foregoing general description, I have set out certain objects, advantages and purposes of my invention. Other objects, advantages and purposes will be apparent from a consideration of the following description and the accompanying drawings in which FIGURE 1 is a side elevation of a vehicle using the device of my invention;
FIGURE 2 is a top plan view of the vehicle of FIGURE 1;
FIGURE 3 is an enlarged detail view of a wheel and drum used in my invention;
FIGURE 4 is a section on the line IV—IV of FIGURE 3; and
FIGURE 5 is an exploded isometric view showing the telescoping nature of the drums.

Referring to the drawings, I have illustrated a four wheel drive vehicle 10 such as a "Jeep" having front driven wheels 11 and 12. Drums 13 and 14 are fixed to the wheels 11 and 12 by the holding heads on a part of studs 15 engaging the periphery of openings 16 in internal flanges 17. Opening 18 in flange 17 pass over the remaining holding heads of studs 15. This permits the winch drums to be attached without removing all of the nuts from the studs or all of the holding bolts where bolts are used instead of studs.

A cable 19 having enlarged ends 20 is passed through a pulley 21 having a pulley wheel 22 of sufficient diameter to permit free movement of the cable therethrough. The enlarged ends are passed through rings 23 in guides 24 which are fixed to the bumper 25 of the vehicle. The ends are then passed through guide tubes 26 preferably loosely attached at rings 23 as by chains 27 so that they are free to change position and rotate about the cable as the wheel turns. These guide tubes prevent fouling of the cable by the rotation of wheels 11 and 12 even in cases where chains are used on the wheels. The enlarged ends are passed through the large portion 28 of keyhole openings in the drums 13 and 14 and are held by moving the cable into slots 29 of the same keyhole opening. The pulley 21 is fixed to a firm support member 30 such as a tree by means of chain 31 or similar means.

A vehicle with the device of my invention attached as hereinabove described is readily extricated from mud, sand, snow or similar material in which traction is unavailable by simply operating the drive wheels. The cable 19 is spooled onto one or both drums 13 and 14 while maintaining a constant and equal load on each by reason of the free passage of the cable over pulley wheel 22. At the same time, guide rings 23 and guide tubes 26 permit the cable to pass onto drums 13 and 14 without any danger of fouling the cable on the vehicle or the driven wheels.

As shown in FIGURE 5 the drums 13 and 14 may be nested one within the other, the outer diameter of drum 13 being slightly smaller than the inner diameter of drum 14. Preferably the outer flanges 13a and 14a for retaining the cable on the drums are the same outer diameter.

While I have illustrated and described a present preferred embodiment of my invention in the foregoing general description, it will be understood that this invention may be otherwise embodied within the scope of the following claims.

I claim:
1. A winch attachment for powered vehicles having a pair or spaced apart driven wheels comprising a pair of cylindrical members having radially outwardly extending flanges at one end and radially inwardly extending flanges at the other forming an axle receiving opening, a plurality of spaced openings in said inwardly extend- ing flange adapted to pass over the studs of a driven vehicle wheel at least half of which are engageable by the holding heads of said studs, the balance of said openings passing freely over said holding heads, a cable adapted to be removably attached to said cylindrical members at its ends, a single pulley member carrying said cable intermediate its ends for free movement therethrough, means on said pulley for attaching said pulley to a fixed anchor member and guide means removable attachable to the opposite sides of one end of a vehicle and receiving said cable for free passage therethrough between the cylindrical members and said pulley, said guide means including elongated tubular members articulated on and extending from a point adjacent the end of the vehicle to a point adjacent the cylindrical members.

2. A winch attachment as claimed in claim 1 wherein the tubular members are freely rotatable about the cable.

3. A winch attachment as claimed in claim 1 wherein the cylindrical members are telescopable one within the other for storage.

4. A winch attachment for powered vehicles having a pair of spaced apart driven wheels comprising a pair of cylindrical members having radially outwardly extending flanges at one end and radially inwardly extending flanges at the other forming an axle receiving opening, a plurality of spaced openings in said inwardly extending flange adapted to pass over the studs of a driven vehicle wheel at least half of which are engageable by the holding heads of said studs, the balance of said openings passing freely over said holding heads, a cable adapted to be removably attached to said cylindrical members at its ends, a single pulley member carrying said cable intermediate its ends for free movement therethrough, means on said pulley for attaching said pulley to a fixed anchor member, ring means removable attachable to the end of a vehicle and receiving said cable for free passage therethrough between the cylindrical members and said pulley and tubular means surrounding the cable and attached to said ring means extending from said ring means on a line tangential to the cylinders to a point adjacent said cylinders, said tubular means being freely rotatable about said cable.

References Cited by the Examiner
UNITED STATES PATENTS
2,240,570   5/1941   Oesterheld _____ 254—166
3,160,364  12/1964   Bailey.

EVON C. BLUNK, *Primary Examiner.*

SAMUEL F. COLEMAN, *Examiner.*

H. C. HORNSBY, *Assistant Examiner.*